E. H. ANGLE.
ORTHODONTIC IMPLEMENT.
APPLICATION FILED APR. 15, 1920.
1,346,584.
Patented July 13, 1920.
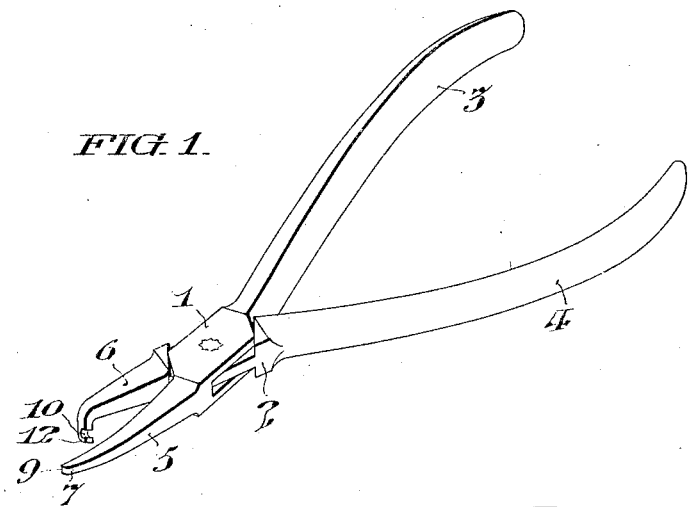
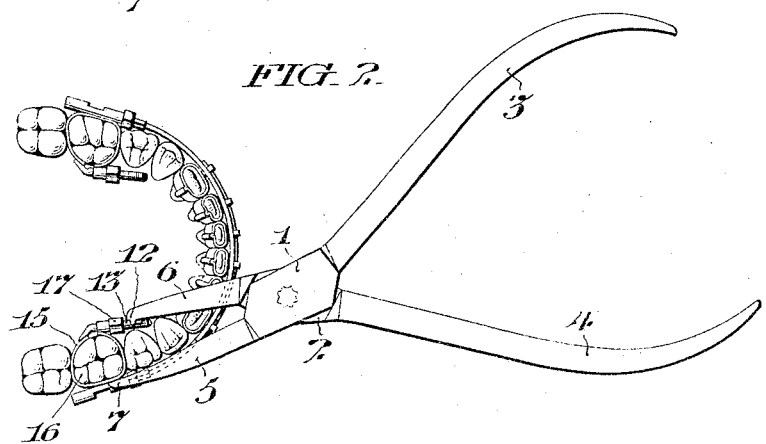
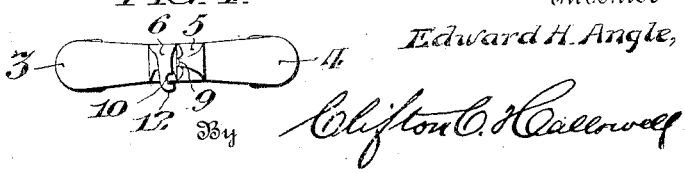
Inventor
Edward H. Angle,
Witness
Elsie F. Jentzsch.
By Clifton C. Callwell
Attorney

UNITED STATES PATENT OFFICE.

EDWARD H. ANGLE, OF PASADENA, CALIFORNIA.

ORTHODONTIC IMPLEMENT.

1,346,584.     Specification of Letters Patent.     Patented July 13, 1920.

Application filed April 15, 1920. Serial No. 374,100.

*To all whom it may concern:*

Be it known that I, EDWARD H. ANGLE, a citizen of the United States, and a resident of Pasadena, county of Los Angeles, State of California, have invented certain new and useful Improvements in Orthodontic Implements, of which the following is a specification, reference being had to the accompanying drawings.

My invention relates particularly to that class of devices that are adapted to facilitate the placing or adjustment of tooth-positioning devices, and is particularly directed to implements employed in the manipulation of anchor-bands.

The principal objects of my invention are to provide an implement by which the anchor-band or other tooth-engaging means may be rotatably adjusted upon the tooth, and may be forced to conform thereto, and be held in proper position while being clamped to the tooth.

Other objects of my invention are to provide an implement arranged to adjust anchor-bands to natural teeth, and having members so correlated as to afford free access to the clamping mechanism of the anchor-band, and so formed as to afford freedom of movement without interference with the other teeth in the patient's mouth.

Specifically stated, the form of my invention as hereinafter described, comprehends an implement of the class described, in the form of a pair of pliers having one beak thereof arranged to engage the exterior wall of an anchor-band, and the other beak extended laterally and terminating in a claw, which is arranged to engage the free end portion of the threaded shank of said anchor-band within the dental arch, for the purpose of rotating or twisting said anchor-band into proper position upon the anchor tooth, said beaks being movable toward and from each other for the purpose of pinching the anchor-band around the anchor tooth to conform it thereto.

My invention also includes all of the various novel features of construction and arrangement as hereinafter more definitely specified.

In the accompanying drawings, Figure 1 is a perspective view of a dental implement constructed in accordance with my invention; Fig. 2 is a plan view of the lower dental arch having an orthodontic appliance attached thereto and showing the dental implement, illustrated in Fig. 1, applied to the terminal anchor band and holding it in proper position to be clamped; Fig. 3 is a side elevational view of the implement shown in Figs. 1 and 2; and Fig. 4 is a front elevational view of said implement.

In said figures, the anchor-band placing or adjusting implement comprises a pair of pliers having the pivoted members 1 and 2, provided with handles 3 and 4 and beaks 5 and 6, respectively. The beak 5 has its free end 7 slightly curved inwardly toward the beak 6, and its inner surface slightly concaved by providing it with the longitudinal groove 9, as best shown in Figs. 1 and 4. The beak 6 has its free end bent laterally in outwardly inclined relation to the plane of oscillation of the pivoted members 1 and 2, and its inner surface adjacent to said free end provided with the slot 10 extending transversely thereof to form the claw 12.

As best shown in Fig. 2, the claw 12 is arranged to grasp the free end portion of the threaded shank 13 of the anchor-band 15, and hold it as close as possible to the inner line of the teeth of the dental arch while it is being clamped to the anchor tooth 16 by rotating the nut 17 on said threaded shank 13 in a manner well known to the profession.

It will be readily seen that by engaging the beak 5 with the exterior wall of the anchor-band 15 and engaging the threaded shank 13 by the claw 12 of the beak 6, which may extend across the dental arch as shown in Fig. 2, the anchor-band may be pinched tightly around the anchor tooth 16 by squeezing the handles 3 and 4 toward each other, and at the same time said anchor-band may be rotatably twisted upon the anchor tooth 16 for adjusting it in its proper relation thereon.

It may be here noted that an implement constructed in accordance with my invention may be advantageously employed to direct the free end of the threaded shank of the anchor-band toward the teeth while being clamped to the anchor tooth, so as not to interfere with the tongue of the patient.

I do not desire to limit my invention to the precise details of construction and arrangement as herein set forth, as it is obvious that various modifications may be made therein without departing from the essential features of my invention as defined in the appended claims.

Having thus described my invention, I claim:—

1. An implement of the class described, comprising pivoted members movable toward and from each other, and arranged to embrace a tooth-band, one member being arranged to engage the band and the other being arranged to engage the threaded shank thereof.

2. An implement of the class described, comprising a pair of pliers having opposed beaks, one of which is bent laterally to form a claw.

3. An implement of the class described, comprising a pair of pliers having opposed beaks, one of which is curved inwardly and the other bent laterally to form a claw.

4. An implement of the class described, comprising a pair of pliers having opposed beaks, one having a concaved inner surface and the other having a transverse groove to provide a claw.

5. An implement of the class described, comprising a pair of pliers having opposed beaks, one of which is curved inwardly and provided with a concaved inner surface, and the other being extended laterally oblique to the plane of oscillation of said beaks, and provided with a groove adjacent to its free end forming a claw.

In witness whereof I have hereunto set my hand this 7 day of April, A. D. 1920.

EDWARD H. ANGLE.

Witnesses:
ANNA HOPKINS ANGLE,
BLANCHE I. BANBURY.